United States Patent
Motohashi

(10) Patent No.: US 11,898,866 B2
(45) Date of Patent: Feb. 13, 2024

(54) INFORMATION COLLECTION DEVICE, AND CONTROL METHOD

(71) Applicant: Faurecia Clarion Electronics Co., Ltd., Saitama (JP)

(72) Inventor: Masataka Motohashi, Saitama (JP)

(73) Assignee: Faurecia Clarion Electronics Co., Ltd., Saitama (JP)

(*) Notice: Subject to any disclaimer, the term of this patent is extended or adjusted under 35 U.S.C. 154(b) by 432 days.

(21) Appl. No.: 17/261,339

(22) PCT Filed: May 30, 2019

(86) PCT No.: PCT/JP2019/021595
§ 371 (c)(1),
(2) Date: Jan. 19, 2021

(87) PCT Pub. No.: WO2020/021852
PCT Pub. Date: Jan. 30, 2020

(65) Prior Publication Data
US 2021/0262816 A1    Aug. 26, 2021

(30) Foreign Application Priority Data

Jul. 24, 2018  (JP) .................. 2018-138739

(51) Int. Cl.
G10L 15/22    (2006.01)
G01C 21/36    (2006.01)
G01C 21/34    (2006.01)

(52) U.S. Cl.
CPC ..... *G01C 21/3608* (2013.01); *G01C 21/3484* (2013.01); *G01C 21/3626* (2013.01);
(Continued)

(58) Field of Classification Search
CPC ................................... G01C 21/3608
See application file for complete search history.

(56) References Cited

U.S. PATENT DOCUMENTS 6,029,069 A     2/2000  Takaki
2003/0187573 A1* 10/2003 Agnew .............. G01C 21/3492
                                                                  701/414
(Continued)

FOREIGN PATENT DOCUMENTS

CN        1484752 A      3/2004
CN      102213597 A     10/2011
(Continued)

OTHER PUBLICATIONS

International Search Report of PCT/JP2019/021595 dated Aug. 13, 2019.
(Continued)

*Primary Examiner* — Seong-Ah A Shin
(74) *Attorney, Agent, or Firm* — IP Business Solutions, LLC

(57) ABSTRACT

Annoyance is reduced that is caused to a subject person from which information is collected. An information collection device includes: a position acquisition section 24 that acquires a current position of an own vehicle; a surroundings search section 51 that searches for a facility Qa in surroundings of the own vehicle; a question generation section that generates a question related to a visit destination A of a subject person; a question output necessity determination section that determines whether or not it is necessary to perform output of the question, based on at least one of a result of the acquisition by the position acquisition section 24, the number of results of the search by the surroundings search section 51, and a going-out duration of the subject person; a question output control section that outputs the question, depending on a result of the determination by the question output necessity determination section; and a collection section 53 that collects information on the visit (Continued)

destination A, based on input information input by the subject person in response to the question.

9 Claims, 6 Drawing Sheets

(52) U.S. Cl.
CPC ........ *G10L 15/22* (2013.01); *G10L 2015/221* (2013.01); *G10L 2015/223* (2013.01)

(56) References Cited

U.S. PATENT DOCUMENTS

| | | | |
|---|---|---|---|
| 2004/0102899 | A1 | 5/2004 | Kaji et al. |
| 2007/0156331 | A1 | 7/2007 | Terada et al. |
| 2008/0262839 | A1* | 10/2008 | Nonaka ............... G01C 21/3608 |
| 2010/0268447 | A1* | 10/2010 | Griffiths ............. G01C 21/3423 701/532 |
| 2013/0344896 | A1* | 12/2013 | Kirmse ............... G06F 16/9537 455/456.3 |
| 2013/0345961 | A1* | 12/2013 | Leader .................. G01C 21/20 701/410 |
| 2014/0279723 | A1* | 9/2014 | McGavran .......... G01C 21/362 707/610 |
| 2015/0006167 | A1 | 1/2015 | Kato et al. |
| 2015/0378672 | A1* | 12/2015 | Tanaka ............... G01C 21/3608 704/275 |
| 2016/0033297 | A1 | 2/2016 | Konishi et al. |
| 2017/0069205 | A1* | 3/2017 | Nguyen ................ B60W 40/04 |
| 2020/0327179 | A1* | 10/2020 | Matsumoto ........ G01C 21/3679 |
| 2020/0378783 | A1* | 12/2020 | Neubauer ................ G06N 5/04 |

FOREIGN PATENT DOCUMENTS

| | | |
|---|---|---|
| CN | 104412323 A | 3/2015 |
| CN | 105143824 A | 12/2015 |
| CN | 106815985 A | 6/2017 |
| CN | 108072376 A | 5/2018 |
| EP | 3447658 A1 | 2/2019 |
| JP | H9-319991 A | 12/1997 |
| JP | 2001033268 A | 2/2001 |
| JP | 2004045616 A | 2/2004 |
| JP | 2005257305 A | 9/2005 |
| JP | 2010078515 A | 4/2010 |
| JP | 2012024481 A | 2/2012 |
| JP | 2012-177703 A | 9/2012 |
| JP | 2012198216 A | 10/2012 |
| JP | 2017194850 A | 10/2017 |
| WO | 2005064275 A1 | 7/2005 |

OTHER PUBLICATIONS

Written Opinion of the International Searching Authority of PCT/JP2019/021595 dated Aug. 13, 2019.
Extended European Search Report mailed by European Patent Office dated Apr. 5, 2022 in corresponding European patent application No. 19840159.8-1001.
International Preliminary Report on Patentability of PCT Application No. PCT/JP2019/021595 dated Feb. 4, 2021.
Written Opinion of the International Searching Authority of PCT Application No. PCT/JP2019/021595 dated Aug. 13, 2019.
Japanese Office Action mailed by Japanese Patent Office dated Mar. 14, 2023 in corresponding Japanese patent application No. 2020-532186.
The European Office Action mailed by European Patent Office dated Mar. 16, 2023 in corresponding European patent application No. 19 840 159.8.
The Chinese Office Action mailed by Chinese Patent Office dated Aug. 23, 2023 in corresponding Chinese patent application No. 201980048905.7.

* cited by examiner

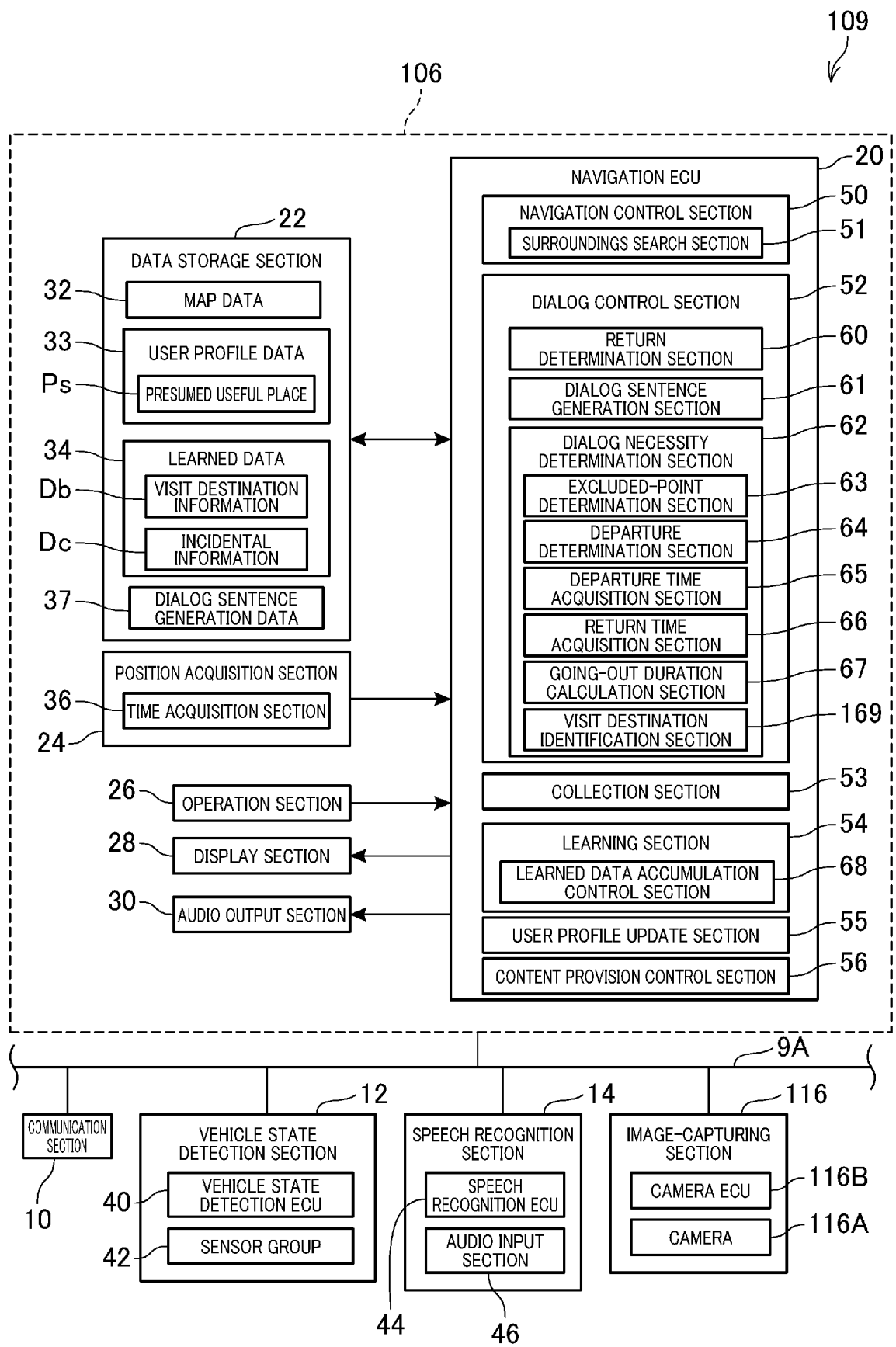

INFORMATION COLLECTION DEVICE, AND CONTROL METHOD

TECHNICAL FIELD

The present invention relates to an information collection device and a control method.

BACKGROUND ART

A technique has been proposed in which an in-vehicle device mounted in a vehicle outputs, by voice, a question for identifying a visit destination visited by a user, and performs speech recognition of voice uttered when the user orally answers the question, whereby the visit destination is identified (for example, see Patent Literature 1).

CITATION LIST

Patent Literature

[Patent Literature 1]
Japanese Patent Laid-Open No. 2012-198216

SUMMARY OF INVENTION

Technical Problem

In Patent Literature 1, a question is uttered each time the vehicle is stopped, and the user sometimes feels annoyance. Consequently, the user does not answer at all questions from the in-vehicle device, or the user stops the function of the in-vehicle device of uttering a question, so that information on a visit destination cannot be acquired in some cases.

An object of the present invention is to provide an information collection device and a control method that can reduce annoyance caused to a subject person from which information is collected.

Solution to Problem

The present description incorporates the disclosure of Japanese Patent Application No. 2018-138739 filed on Jul. 24, 2018, by reference in its entirety.

An aspect of the present invention provides an information collection device, including: a position acquisition section that acquires a current position of an own vehicle; a surroundings search section that searches for a facility in surroundings of the own vehicle; a question generation section that generates a question related to a visit destination of a subject person; a question output necessity determination section that determines whether or not it is necessary to perform output of the question, based on at least one of a result of the acquisition by the position acquisition section, the number of results of the search by the surroundings search section, and a going-out duration of the subject person; a question output control section that outputs the question, depending on a result of the determination by the question output necessity determination section; and a collection section that collects information on the visit destination, based on input information input by the subject person in response to the question.

According to an aspect of the present invention, in the information collection device, the question output necessity determination section determines that it is not necessary to perform output of the question when the result of the acquisition by the position acquisition section is an excluded point preset by the subject person.

According to an aspect of the present invention, in the information collection device, the question output necessity determination section determines that it is necessary to perform output of the question when the number of the results of the search by the surroundings search section is one.

According to an aspect of the present invention, in the information collection device, when the number of the results of the search by the surroundings search section is two or more, the question output necessity determination section determines that it is not necessary to perform output of a dialog sentence including the question when the going-out duration exceeds a maximum threshold value, and determines that it is necessary to perform output of the dialog sentence including the question when the going-out duration does not exceed the maximum threshold value.

According to an aspect of the present invention, the information collection device further includes a return determination section that determines that the subject person returns to the own vehicle from the visit destination, based on a vehicle state of the own vehicle, wherein when it is determined by the return determination section that the subject person returns to the own vehicle, the question output necessity determination section determines whether or not it is necessary to perform output of the question.

According to an aspect of the present invention, in the information collection device, the question output necessity determination section determines that it is not necessary to perform output of the question when an elapsing time period does not exceed a predetermined minimum threshold value, the elapsing time period since the subject person left the own vehicle until it is determined by the return determination section that the subject person returns to the own vehicle.

According to an aspect of the present invention, the information collection device further includes a visit destination identification section that identifies the visit destination, based on a captured image of a held item held by the subject person who returns, wherein even if it is determined that it is not necessary to perform output of the question, the question output necessity determination section determines that it is necessary to perform output of the question when the visit destination is identified by the visit destination identification section.

Another aspect of the present invention is a control method in an information collection device, including: a first step of acquiring a current position of an own vehicle; a second step of searching for a facility in surroundings of the own vehicle; a third step of generating a question related to a visit destination of a subject person; a fourth step of determining whether or not it is necessary to perform output of the question, based on at least one of a result of the acquisition of the current position in the first step, the number of results of the search in the second step, and a going-out duration of the subject person; a fifth step of outputting the question, depending on a result of the determination in the fourth step; and a sixth step of collecting information on the visit destination, based on input information input by the subject person in response to the question.

Advantageous Effect of Invention

According to the present invention, it is possible to reduce annoyance caused to a subject person from which information is collected.

BRIEF DESCRIPTION OF DRAWINGS

FIG. 6 shows a configuration of a navigation device together with an in-vehicle system, according to a modification example of the present invention.

DESCRIPTION OF EMBODIMENT

Hereinafter, an embodiment of the present invention will be described with reference to drawings.

Figure 1:
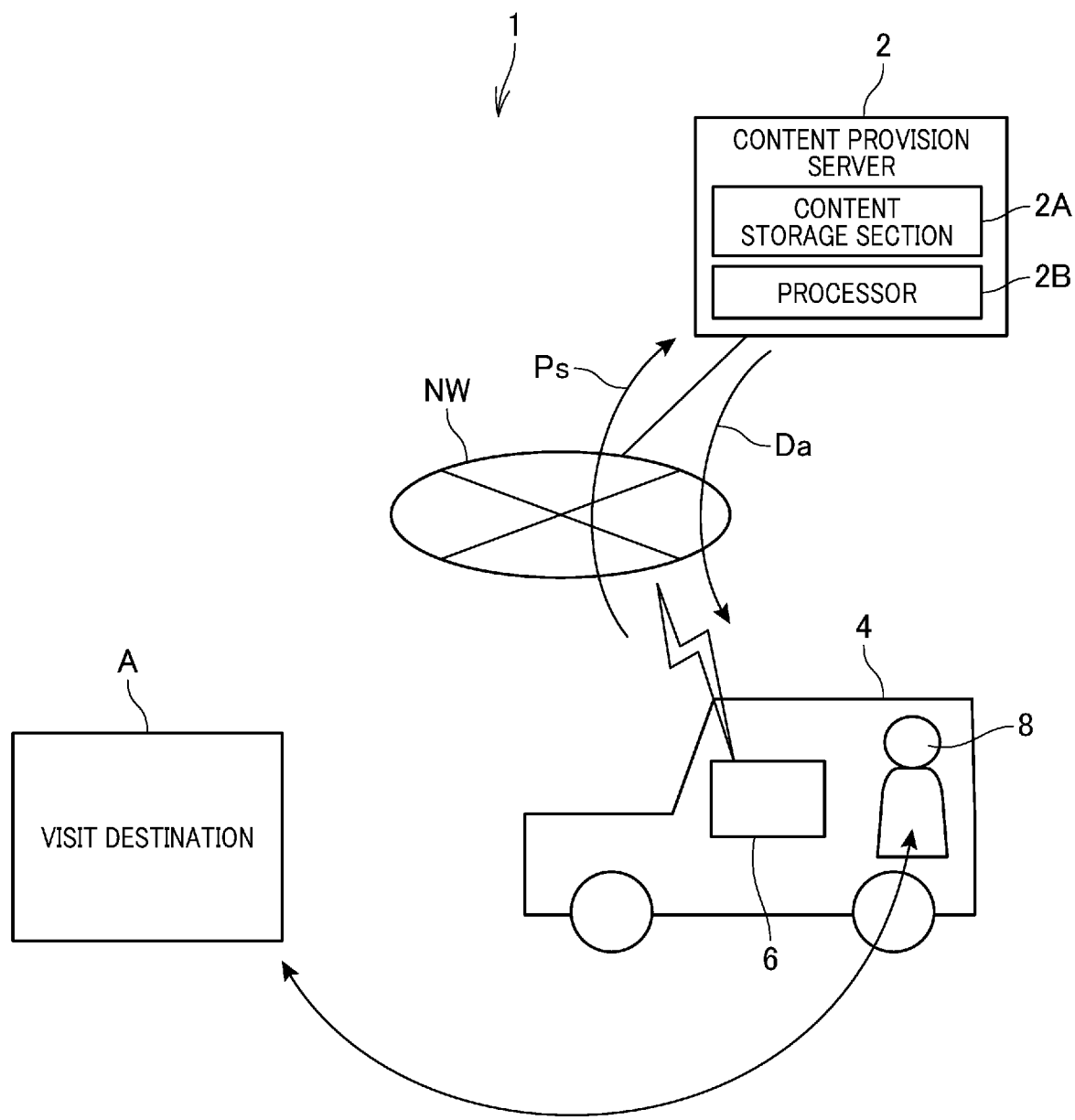
FIG. 1 shows a configuration of an information provision system according to an embodiment of the present invention.

FIG. 1 shows a configuration of an information provision system 1 according to the present embodiment.

The information provision system 1 in the present embodiment includes a content provision server 2 and a navigation device 6 mounted in an own vehicle (hereinafter, referred to as the vehicle 4), which are communicably connected to each other through a communication network NW. The communication network NW is a telecommunication circuit including a mobile communication network such as a mobile telephone network or an automobile communication network to which the vehicle 4 is communicationally connected, and a fixed-line communication network such as the Internet to which the content provision server 2 is connected.

The content provision server 2 is a server computer that provides the navigation device 6 with a content Da associated with a place on a map included in the navigation device 6. Places on the map include, for example, eating and drinking establishments, various mass retailers, commercial complexes, tenants of the commercial complexes, amusement parks, parks, and other facilities, as well as any points and areas that can be POIs (Points Of Interest) on the map.

A content Da is data for providing any information that can be associated with a POI, to an occupant 8 that is an example of a subject person. For example, the content Da provides information on sales or an event that takes place at the point of interest, information on traffic at the point of interest, or information on news (an affair) or the like that has occurred at, or in a vicinity of, the point of interest.

As shown in FIG. 1, the content provision server 2 includes a content storage section 2A and a processor 2B. The content storage section 2A includes a storage such as an HDD or an SSD that stores contents Da. The processor 2B centrally controls the content provision server 2, and implements a function of providing a content Da to the navigation device 6. Specifically, when a target POI is received from the navigation device 6, the processor 2B extracts a content Da associated with the POI from the content storage section 2A and transmits the extracted content Da to the navigation device 6.

Note that such a function of the processor 2B is implemented in such a manner that the processor 2B executes a program stored in an arbitrary storage of the content provision server 2.

The navigation device 6 is an example of an IVI (in-vehicle infotainment) device, and includes a navigation function of displaying a route on the map and guiding the occupant 8 along the route, as well as an information collection function, a learning function, and an information provision function.

The information collection function is a function of collecting visit destination information Db that is information on a visit destination A visited by the occupant 8 of the vehicle 4 after the occupant 8 leaves the vehicle 4. The learning function is a function of learning a specific place presumed to be useful to the occupant 8 (hereinafter, "presumed useful place Ps"), based on the visit destination information Db. The information provision function is a function of providing the occupant 8 with a content Da associated with a presumed useful place Ps.

Presumed useful places Ps include, for example, a place used by the occupant 8 on a daily basis, a place that the occupant 8 is curious about or interested in, a place matching with a taste of the occupant 8, and the like.

The navigation device 6 carries out a dialog by voice when the occupant 8 who has left the vehicle returns to the vehicle 4, and acquires visit destination information Db from the occupant 8 through the dialog. The dialog includes at least a question related to a visit destination A of the occupant 8. Hereinafter, a dialog for collecting visit destination information Db will be referred to as "visit information collection dialog".

Figure 2:
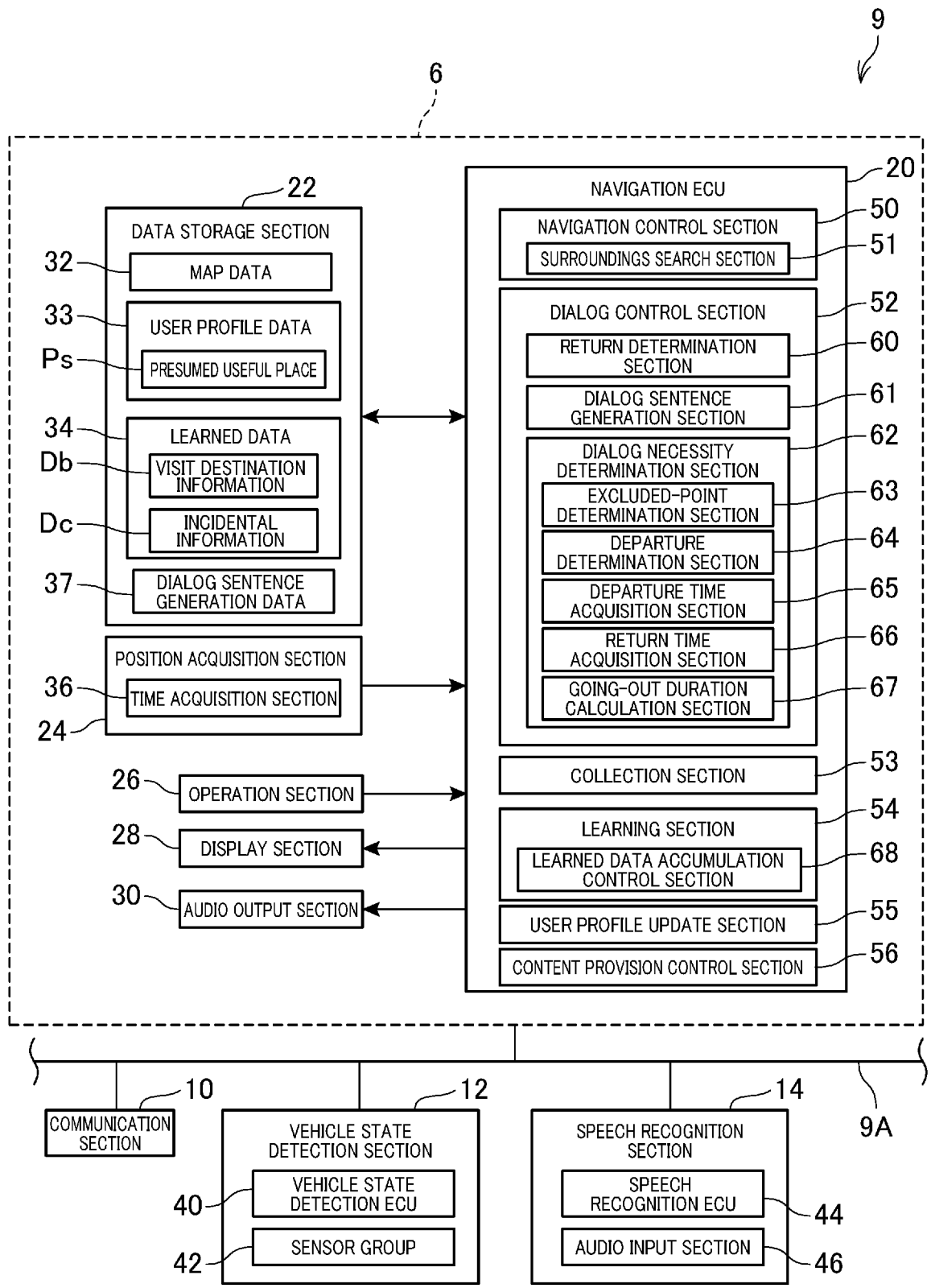
FIG. 2 shows a configuration of a navigation device together with an in-vehicle system.

FIG. 2 shows a configuration of the navigation device 6 together with an in-vehicle system 9.

The in-vehicle system 9 includes the navigation device 6, a communication section 10, a vehicle state detection section 12, and a speech recognition section 14, which are connected to a communication bus 9A laid in the vehicle 4, so as to be able to communicate with each other in accordance with a predetermined communication protocol. For the communication protocol, an appropriate protocol is used, for example, CAN, LIN (Local Interconnect Network), FlexRay®, Ethernet®, or the like.

The navigation device 6 includes a navigation ECU 20, a data storage section 22, a position acquisition section 24, an operation section 26, a display section 28, and an audio output section 30.

The navigation ECU 20 is an electronic control unit (ECU) that controls a whole of the navigation device 6. The electronic control unit includes a processor such as a CPU, a memory device such as a ROM or a RAM, an I/O circuit that connects various devices and circuits, and a communication transceiver for performing communication via the in-vehicle system 9. The navigation ECU 20 in the present embodiment centrally controls the navigation device 6 and implements the navigation function, the information collection function, the learning function, and the information provision function in such a manner that the processor executes a program stored in the ROM, or a program loaded on the RAM.

The data storage section 22 includes a storage in which various data is recorded. An arbitrary recording medium such as an HDD, an SSD, a DVD, a CD, or a semiconductor solid-state memory is used for the storage, and map data 32 used for route guidance is recorded in the storage. Moreover, in the present embodiment, user profile data 33, learned data 34, and dialog sentence generation data 37 are stored in the storage of the data storage section 22.

The user profile data 33 is data representing an attribute and a characteristic of the occupant 8 and includes, for example, an age, a gender, a hobby, a taste, a matter of interest, and information on one or more presumed useful places Ps.

The learned data 34 is accumulated data on visit destination information Db collected from the occupant 8, and the learned data 34 includes arbitrary incidental information Dc incidental to a visit destination A in the visit destination information Db. Examples of the incidental information Dc include a date and time of a visit to the visit destination A, a purpose of the visit to (a task at) the visit destination A, an affair performed at the visit destination A, a duration of a stay at the visit destination A, an impression gained by the occupant 8 who visited the visit destination A, and the like.

Note that in the present embodiment, the incidental information Dc preferably includes information based on which a degree of interest of the occupant 8 in the visit destination A, a degree of favorableness of the visit destination A to the occupant 8, a frequency of use of the visit destination A by the occupant 8, or the like can be identified or presumed.

The dialog sentence generation data 37 is various data used to generate a dialog sentence in the visit information collection dialog.

The position acquisition section 24 includes various position detection devices for detecting a current position of the vehicle 4, and outputs the current position to the navigation ECU 20 in response to a request from the navigation ECU 20. The position detection devices are devices capable of detecting the current position, orientation, vehicle traveling speed, and the like of the vehicle 4, and examples of the position detection devices include a GPS sensor, a vehicle-speed sensor, a steering sensor, a gyro sensor, and the like. In the present embodiment, the position acquisition section 24 includes a GPS sensor, and also functions as a time acquisition section 36 that acquires a current time based on a GPS signal received by the GPS sensor and outputs the current time to the navigation ECU 20.

Note that the position acquisition section 24 may communicate with an external device such as a mobile telephone or a smartphone that includes a function of detecting a current position, and may acquire the current position from the external device. Moreover, a clock circuit measuring date and time may be provided as the time acquisition section 36, separately from the position acquisition section 24.

The operation section 26 includes an input device that receives an operation made by the occupant 8 and outputs the operation to the navigation ECU 20. Examples of the input device include a plurality of mechanical switches, a touch panel, and the like.

The display section 28 includes a display device that displays various information, under control of the navigation ECU 20. For the display device, for example, a flat-panel display, a HUD (head-up display), or the like is used. In the present embodiment, information, such as a map around the vehicle 4, route guidance (a route along which the vehicle 4 will travel), and a content Da associated with each above-described POI on the map, is displayed on the display device.

The audio output section 30 includes a speaker that outputs various sounds in a vehicle cabin, under control of the navigation ECU 20. Audio guidance related to route guidance, guidance on traffic information, voice notifying a content Da, and the like are output from the speaker. Moreover, in the present embodiment, a dialog sentence in the above-mentioned visit information collection dialog, which allows the navigation device 6 to identify a visit destination A of the occupant 8 and to acquire incidental information Dc on the visit destination A, is output by voice from the audio output section 30.

The communication section 10 includes a communication module that communicates with the content provision server 2 via the communication network NW. The communication module is a module including a reception circuit and a transmission circuit for communicating with the mobile communication network in the communication network NW, and is, for example, a DCM (Data Communication Module), a mobile telephone, or the like. Note that the communication section 10 can also be used for communication with a telematics server that provides various telematic services.

The vehicle state detection section 12 is a section that detects and outputs to the navigation ECU 20 various vehicle states at a time when the vehicle 4 is stopped, and includes a vehicle state detection ECU 40 and a sensor group 42.

The vehicle state detection ECU 40 is an electronic control unit that outputs a result of detection of a vehicle state, in response to a request from the navigation ECU 20.

The sensor group 42 includes a plurality of sensors that detect vehicle states at a time when the vehicle is stopped. Specifically, the sensor group 42 includes a parking brake sensor that senses an operating state of a parking brake, an accessory switch sensor that senses an on/off state of an accessory switch (ignition switch), a door open/close sensor that senses whether each door of the vehicle 4 is opened or is closed, a seating sensor that senses whether or not the occupant 8 is seated on each seat of the vehicle 4, and the like.

The speech recognition section 14 is a section that performs speech recognition of voice uttered by the occupant 8 and outputs a result of the recognition to the navigation ECU 20, and includes a speech recognition ECU 44 and an audio input section 46.

The audio input section 46 includes a microphone that acquires voice uttered by the occupant 8. Voice uttered by the occupant 8 as an answer in the visit information collection dialog is acquired by the audio input section 46. Note that voice uttered by the occupant 8 will be referred to as "uttered voice" hereinafter.

The speech recognition ECU 44 is an electronic control unit that extracts one or more words included in the uttered voice by performing speech recognition processing on an audio signal based on the uttered voice, and that outputs the extracted word or words as a result of the speech recognition to the navigation ECU 20. In the extraction by the speech recognition ECU 44, a word relevant to visit destination information Db on a visit destination A of the occupant 8 or relevant to incidental information Dc is extracted. The speech recognition ECU 44 may implement the speech recognition processing through software by executing a program, or may implement the speech recognition processing through hardware by containing a circuit part such as an LSI that performs the speech recognition processing. For the speech recognition processing for extracting a word relevant to the visit destination information Db or the incidental information Dc, an existing arbitrary algorithm can be used.

In the navigation device 6, the navigation ECU 20 includes a navigation control section 50, and the navigation control section 50 implements navigation functionality by controlling each section of the navigation device 6. The functionality implemented by the navigation control section 50 includes functions included in an existing car navigation device, such as searching for a route to a destination, displaying a map on the display section 28, displaying the route on the map, and providing audio guidance. Moreover, the navigation control section 50 includes a surroundings search section 51 that searches for a POI in surroundings of a current position. In the present embodiment, among POIs, the surroundings search section 51 searches for a facility Qa that can be a visit destination A.

Further, in the present embodiment, the navigation ECU 20 functions as a dialog control section 52, a collection section 53, a learning section 54, a user profile update section 55, and a content provision control section 56. The functions are implemented in such a manner that the processor executes the program stored in the ROM or the program loaded on the RAM, as mentioned above.

The dialog control section 52 is a section that controls the above-described visit information collection dialog, and carries out the visit information collection dialog particularly when the occupant 8 who has left the vehicle returns to the vehicle 4. The dialog control section 52 includes a return determination section 60, a dialog sentence generation section 61, and a dialog necessity determination section 62.

The return determination section 60 determines that the occupant 8 returns, based on a vehicle state. Specifically, it is determined that the occupant 8 returns when it is detected, based on a result of the detection by the vehicle state detection section 12, that the accessory switch (ignition switch) shifts from the off state to the on state, or when it is sensed by the seating sensor that the occupant 8 is seated, or the like, in a state where the vehicle 4 is stopped.

The dialog sentence generation section 61 generates a dialog sentence in the visit information collection dialog and an audio signal for outputting the dialog sentence by voice, and outputs the audio signal to the audio output section 30. The dialog sentence includes at least a question related to a visit destination A, and the visit destination A is identified based on a result of the search by the surroundings search section 51. For a method for generating a dialog sentence including such a question, a known arbitrary technique can be used.

When it is determined by the return determination section 60 that the occupant 8 returns from the visit destination A, the dialog necessity determination section 62 determines whether or not to carry out the visit information collection dialog. In the present embodiment, the determination uses a current position of the vehicle 4 (a position at a time when the vehicle 4 is stopped), a time at which the occupant 8 goes out from the vehicle 4 (hereinafter, referred to as "departure time"), a duration for which the occupant 8 leaves the vehicle 4 (that is, an elapsing time period since the departure time), and the number of results of the search by the surroundings search section 51 (the number of facilities Qa hit in the search). To perform such determination, the dialog necessity determination section 62 includes an excluded-point determination section 63, a departure determination section 64, a departure time acquisition section 65, a return time acquisition section 66, and a going-out duration calculation section 67.

The excluded-point determination section 63 determines whether or not the current position is an excluded point. The excluded point is a place that is not registered as a presumed useful place Ps, that is, a place where provision of a content Da from the navigation device 6 is not automatically performed. Such an excluded point is preset by the occupant 8 and recorded in the user profile data 33. In other words, the excluded-point determination section 63 compares the current position acquired by the position acquisition section 24 with each excluded point recorded in the user profile data 33, and determines whether or not the current position is an excluded point. When the current position is an excluded point, the dialog necessity determination section 62 determines that it is not necessary to carry out the visit information collection dialog.

The departure determination section 64 determines whether or not the occupant 8 goes out (departs) from the vehicle 4. Specifically, the departure determination section 64 determines that the occupant 8 goes out when it is detected, based on a result of the detection by the vehicle state detection section 12, that the accessory switch (ignition switch) shifts from the on state to the off state, or when it is sensed by the seating sensor that the occupant 8 moves away from a seat, or the like.

When it is determined by the departure determination section 64 that the occupant 8 goes out, the departure time acquisition section 65 acquires a time when the occupant 8 goes out from the time acquisition section 36, and records the time as a departure time in the data storage section 22, the RAM, or the like.

When it is determined by the return determination section 60 that the occupant 8 returns to the vehicle 4, the return time acquisition section 66 acquires a time when the occupant 8 returns to the vehicle 4 from the time acquisition section 36, and records the time as a return time in the data storage section 22, the RAM, or the like.

The going-out duration calculation section 67 calculates a going-out duration for which the occupant 8 went out to the visit destination A, based on the departure time and the return time.

When the going-out duration is equal to or shorter than a minimum threshold value Tmin, the dialog necessity determination section 62 determines that it is not necessary to carry out the visit information collection dialog. The minimum threshold value Tmin is a minimum time period in which it can be presumed that the occupant 8 did some task (a purpose of a visit) at some visit destination A, and is set to an appropriate length of time such as "10 minutes" or "several minutes".

Moreover, when it is presumed that the occupant 8 did a task at each of a plurality of visit destinations A, that is, when it is presumed that the number of visit destinations A visited by the occupant 8 is not one, the dialog necessity determination section 62 also determines that it is not necessary to carry out the visit information collection dialog. Such presumption is performed based on the number of candidates for visit destination A that exist around the current position of the vehicle 4, and on the going-out duration. Specifically, when a plurality of candidates for visit destination A exist around the current position of the vehicle 4, and when the going-out duration is equal to or longer than a maximum threshold value Tmax, it is presumed that the occupant 8 did a task at each of a plurality of visit destinations A.

The maximum threshold value Tmax is a time period in which it can be presumed that the occupant 8 visited a plurality of visit destinations A in turn and did a task at each of the visit destinations A.

Figure 3:
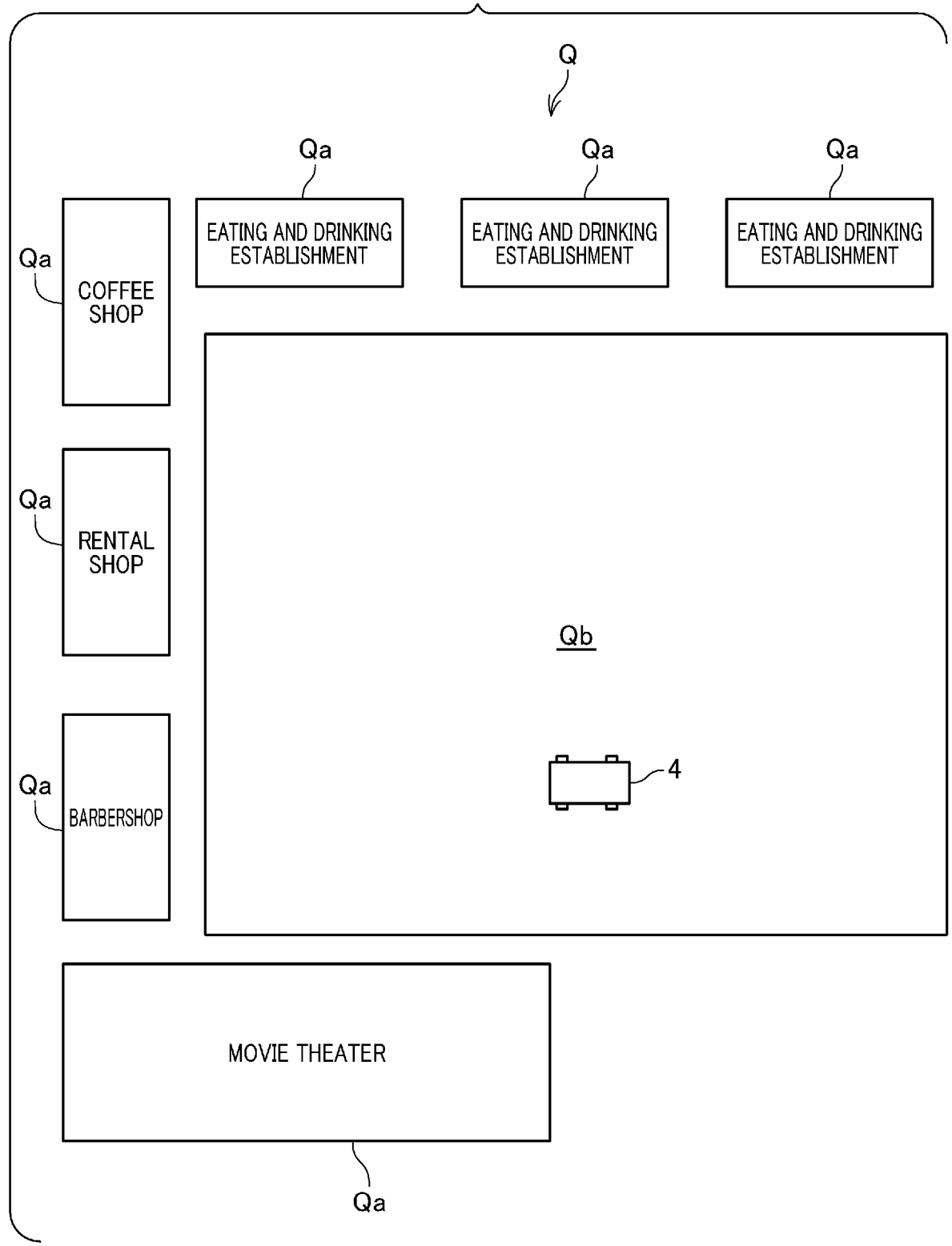
FIG. 3 shows an example of a facility around a place where a vehicle is stopped.

For example, as shown in FIG. 3, when the vehicle 4 is stopped at a parking lot Qb of a commercial complex Q where various facilities Qa called tenants, such as eating and drinking establishments and shops, are gathered, a plurality of facilities Qa exist around the vehicle 4, as facilities Qa that are candidates for visit destination A. In such a case, when the going-out duration exceeds the maximum threshold value Tmax, it is presumed that the occupant 8 visited a plurality of facilities Qa and did a task such as shopping or eating at each of the facilities Qa.

In the present embodiment, a required time period required for the occupant 8 to do a task is preset in the map data 32 or the like for each facility Qa, according to a type, or a type of business, of the facility Qa. The dialog necessity determination section 62 sets, as the maximum threshold value Tmax, a longest one of the required time periods for the candidates for visit destination A in surroundings, and compares the going-out duration with the longest required time period. For example, when a visit destination A is an eating and drinking establishment such as a fast-food restaurant, a coffee shop, or a restaurant, a time period of approximately one to two hours is set as a required time period. For a visit destination A where a time period of use (a time period of eating and drinking) per occasion of use is fixed, such a time period of use may be set as a required time period. A required time period for each visit destination A may be varied as appropriate, based on peak hours, days of week, or the like.

The collection section 53 collects visit destination information Db on the occupant 8 and incidental information Dc, based on a result of the visit information collection dialog. Specifically, the collection section 53 has the speech recognition section 14 to perform speech recognition of uttered voice of the occupant 8 in the visit information collection dialog. A result of the speech recognition is input information input by the occupant 8 through the uttered voice, and the collection section 53 generates at least one of visit destination information Db and incidental information Dc, based on the result of the speech recognition. In the generation of the incidental information Dc, appropriate information such as a date and time and current position information is used, in addition to a word acquired from the uttered voice.

The learning section 54 is a section that learns the visit destination information Db on the occupant 8 and the incidental information Dc, and includes a learned data accumulation control section 68. Each time visit destination information Db and incidental information Dc are collected by the collection section 53, the learned data accumulation control section 68 accumulates the visit destination information Db and the incidental information Dc as the learned data 34 in the data storage section 22. The learning section 54 learns a presumed useful place Ps to the occupant 8, based on a result of the accumulation of the visit destination information Db and the incidental information Dc.

Specifically, for each visit destination A respectively indicated by each visit destination information Db, the learning section 54 determines whether or not the visit destination A is a presumed useful place Ps, based on a history of visits (the number of visits, frequency of visits, or the like) to the visit destination A and a content of incidental information Dc (a degree of satisfaction, a degree of interest, or the like) incidental to the visit destination A. At the time, for each visit destination A, the learning section 54 may also determine a degree of correspondence to a presumed useful place Ps.

The user profile update section 55 updates the presumed useful place or places Ps in the user profile data 33, based on a result of the learning by the learning section 54.

The content provision control section 56 provides a content Da based on the user profile data 33 to the occupant 8. Specifically, the content provision control section 56 acquires, from the content provision server 2, a content Da associated with a presumed useful place Ps in the user profile data 33, and notifies the content Da to the occupant 8 by outputting from the display section 28 or the audio output section 30. Although a content Da may be provided at any timing, a preferable timing is, for example, when it is highly probable that the occupant 8 moves by the vehicle 4 to a presumed useful place Ps associated with the content Da. Examples of such a timing include when the vehicle 4 is traveling near the presumed useful place Ps, when it is expected, based on past dates and times when the occupant 8 visited the presumed useful place Ps, that the occupant 8 will visit the presumed useful place Ps in the near future, and the like.

Next, operation related to provision of information to the occupant 8 will be described as operation in the present embodiment.

Figure 4:
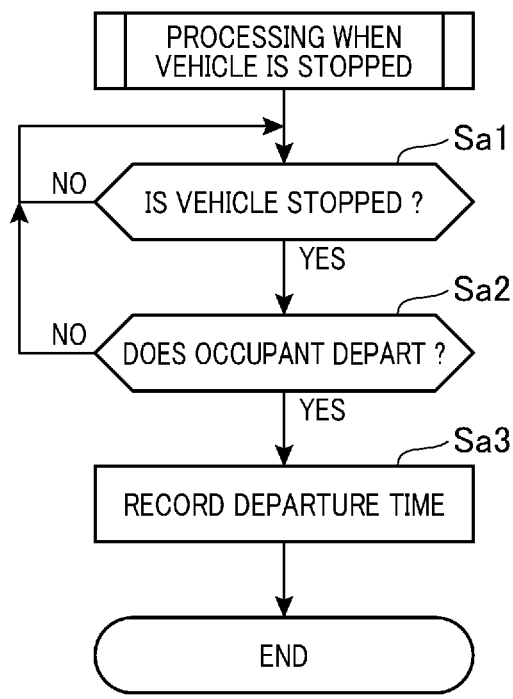
FIG. 4 is a flowchart showing processing when a vehicle is stopped, by a navigation device.

FIG. 4 is a flowchart showing processing when a vehicle is stopped, by the navigation device 6.

The processing when a vehicle is stopped is processing performed when the vehicle 4 is stopped.

Specifically, when the traveling vehicle 4 is stopped (step Sa1), the departure determination section 64 determines whether or not the occupant 8 leaves the vehicle and goes out (departs) (step Sa2). When the occupant 8 goes to a visit destination A (step Sa2: Yes), the departure time acquisition section 65 acquires a time from the time acquisition section 36 and records the time as a departure time in an appropriate recording medium such as the data storage section 22 or the RAM (step Sa3), and then the navigation ECU 20 terminates the processing.

Figure 5:
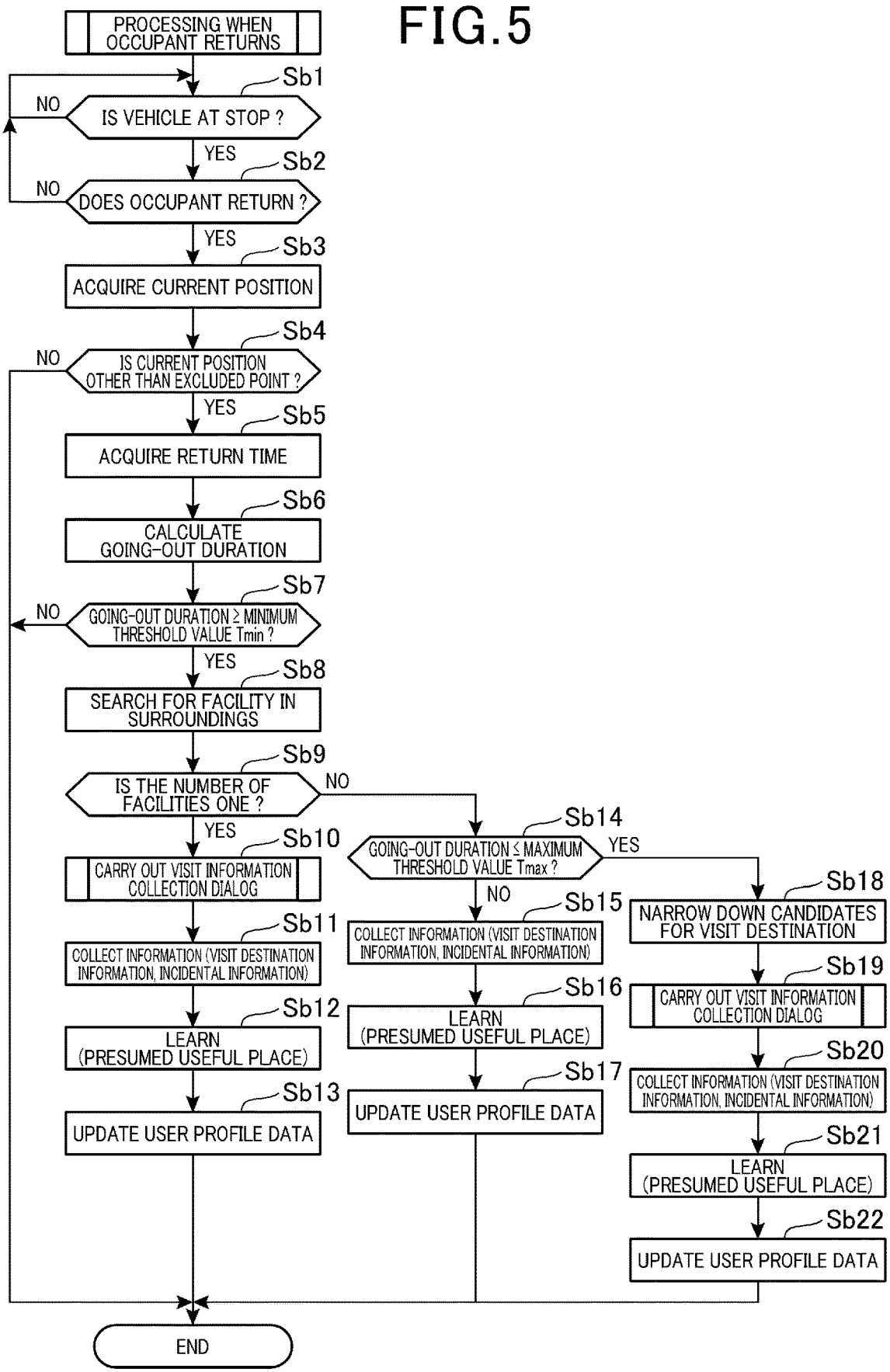
FIG. 5 is a flowchart showing processing when an occupant returns, by the navigation device.

FIG. 5 is a flowchart showing processing when an occupant returns, by the navigation device 6.

The processing when an occupant returns is processing performed when the occupant 8 returns to the stopped vehicle 4, and collection of visit destination information Db through the visit information collection dialog is also performed in the processing.

When the vehicle 4 is at a stop (step Sb1: Yes), the return determination section 60 determines whether or not the occupant 8 returns to the vehicle 4 (step Sb2). Note that a stop of the vehicle 4 is determined by the navigation ECU 20, based on a result of the detection by the vehicle state detection section 12 (for example, a state of the accessory switch or the ignition switch, a driving state of a vehicle power source such as an engine, an operating state of a parking brake, or the like).

When the occupant 8 returns to the vehicle 4 (step Sb2: Yes), the dialog necessity determination section 62 determines whether or not to carry out the visit information collection dialog (that is, whether or not to output a dialog sentence including at least the above-described question), in a following manner. Specifically, first, the excluded-point determination section 63 acquires a current position of the own vehicle from the position acquisition section 24 (step Sb3), and determines whether or not the current position is other than an excluded point (step Sb4). When the current position is an excluded point (step Sb4: No), it is determined by the dialog necessity determination section 62 that it is not necessary to carry out the visit information collection dialog because collection of visit destination information Db is not needed at the current position, and then the navigation ECU 20 terminates the processing.

When the current position is other than an excluded point (step Sb4: Yes), the return time acquisition section 66 acquires a time as a return time from the time acquisition section 36 (step Sb5), and the going-out duration calculation section 67 calculates a going-out duration based on the departure time and the return time (step Sb6).

The dialog necessity determination section 62 determines whether or not the going-out duration is equal to or longer than the above-mentioned minimum threshold value Tmin (step Sb7). When the going-out duration does not exceed the minimum threshold value Tmin (step Sb7: No), the dialog necessity determination section 62 determines that it is not necessary to carry out the visit information collection dialog because a probability is low that the occupant 8 went to any visit destination A and did any task, and then the navigation ECU 20 terminates the processing.

When the going-out duration exceeds the minimum threshold value Tmin (step Sb7: Yes), the dialog necessity determination section 62 performs processing described below in order to determine whether or not the occupant 8 did tasks at a plurality of visit destinations A, that is, whether or not the number of visit destinations A is one.

Specifically, the dialog necessity determination section 62 searches for facilities Qa existing around the current position of the vehicle 4 by using the navigation functionality of the navigation control section 50 (step Sb8), and determines whether or not the number of facilities Qa existing within a certain distance (for example, 50 meters) from the current position is one (step Sb9).

When the number of facilities Qa is one (step Sb9: Yes), the dialog necessity determination section 62 determines that the visit information collection dialog is necessary because possible visit destinations A of the occupant 8 can be narrowed down to the one facility Qa, and the dialog control section 52 carries out the visit information collection dialog (step Sb10). In the visit information collection dialog, since possible visit destinations A are narrowed down to the one facility Qa, the dialog sentence generation section 61 generates not an interrogative dialog sentence that asks which facility Qa the occupant 8 went to, but an interrogative dialog sentence to confirm that the occupant 8 went to the facility Qa, that is, an interrogative dialog sentence in a form of a question to which the occupant 8 can answer with "yes" or "no". Such a dialog sentence is a question, for example, "Have you been to XX facility?". Since such a dialog sentence eliminates a need of uttering the visit destination A and allows the occupant 8 to answer only with "yes" or "no", a burden of the visit information collection dialog on the occupant 8 is reduced.

When the visit information collection dialog is carried out, visit destination information Db and incidental information Dc are collected by the collection section 53, based on a result of the speech recognition of uttered voice of the occupant 8 (step Sb11). The learning section 54 accumulates the collected visit destination information Db and incidental information Dc in the learned data 34 and learns a presumed useful place Ps to the occupant 8, based on a result of the accumulation (step Sb12), and the user profile update section 55 updates the presumed useful place or places Ps in the user profile data 33, based on a result of the learning (step Sb13).

In the determination in step Sb9, when the number of facilities Qa is two or more (step Sb9: No), the dialog necessity determination section 62 determines whether or not the going-out duration is equal to or shorter than the above-described maximum threshold value Tmax (step Sb14). When the going-out duration exceeds the maximum threshold value Tmax (step Sb14: No), it is presumed that the occupant 8 visited a plurality of visit destinations A and did tasks, and the dialog necessity determination section 62 determines that the visit information collection dialog is not necessary.

As a result, in a situation where the occupant 8 visited a plurality of visit destinations A, dialog sentences including many questions to identify the visit destinations A are not uttered from the navigation device 6, and the occupant 8 is prevented from answering to every question in the dialog sentences. Thus, annoyance can be eliminated that is caused to the occupant 8 by carrying out the visit information collection dialog toward the occupant 8 who visited a plurality of places.

However, in the present embodiment, even when it is presumed that the occupant 8 visited a plurality of visit destinations A, the collection section 53 generates visit destination information Db in which a current position replaces the visit destinations A, as well as incidental information Dc, in order to collect an action history indicating that the occupant 8 visited somewhere, and accumulates the visit destination information Db and the incidental information Dc as the learned data 34 (step Sb15). The learning section 54 learns a presumed useful place Ps to the occupant 8, based on a result of the accumulation of the visit destination information Db and the incidental information Dc (step Sb16), and the user profile update section 55 updates the presumed useful place or places Ps in the user profile data 33, based on a result of the learning (step Sb17).

Thus, even when the visit information collection dialog is not carried out, the action history of a visit made by the occupant 8 is accumulated, and a relevant place is learned as a presumed useful place Ps, based on a result of the accumulation.

Note that in step Sb15, for the visit destination information Db, an area, a name of a place, or a name of a facility including the current position (position coordinate) may be used instead of the current position. Thus, the action history of a place visited by the occupant 8 can be more appropriately collected and accumulated.

In step Sb14, when the going-out duration is equal to or shorter than the above-mentioned maximum threshold value Tmax (step Sb14: Yes), it is presumed that the number of visit destinations A visited by the occupant 8 is one. Accordingly, in such a case, it is determined by the dialog necessity determination section 62 that the visit information collection dialog is necessary.

In the present embodiment, prior to carrying out the visit information collection dialog, the dialog control section 52 narrows down candidates for visit destination A visited by the occupant 8 beforehand among a plurality of facilities Qa around the current position of the own vehicle, based on the departure time and the going-out duration (step Sb18). The dialog control section 52 generates a dialog sentence that asks the occupant 8 about a question for identifying a visit destination A among the candidates, and then starts the visit information collection dialog (step Sb19).

When the visit information collection dialog is carried out, visit destination information Db and incidental information Dc are collected by the collection section 53, based on a result of the speech recognition of uttered voice of the occupant 8 (step Sb20). The learning section 54 learns a presumed useful place Ps to the occupant 8, based on a result of the accumulation of the visit destination information Db and the incidental information Dc (step Sb21), and the user profile update section 55 updates the presumed useful place or places Ps in the user profile data 33, based on a result of the learning (step Sb22).

Regarding the operation from step Sb18 to step Sb22, more specifically, when a task (a purpose of a visit) of the occupant 8 can be presumed based on a time period of day including the departure time, the dialog control section 52 extracts, as a candidate, one or more facilities Qa where the task can be done.

For example, when the departure time is noon and a duration for which the vehicle is stopped is one hour, a task of the occupant 8 is presumed to be lunch, and therefore eating and drinking establishments in surroundings are extracted in step Sb18.

In such a case, in step Sb19, first, an interrogative dialog sentence to confirm that the presumed task is correct, such as "Welcome back. Have you eaten lunch?", is generated as the dialog sentence that asks the question for identifying a visit destination A among eating and drinking establishments, and the dialog sentence is output by voice. When the occupant 8 makes an affirmative answer, such as "Yes", to the question in the dialog sentence, a dialog sentence including a question for narrowing down to a visit destination A, such as "What did you eat?", is generated, and the dialog sentence is output by voice.

For the question for narrowing down the plurality of candidates for a visit destination A, typically, not a yes-no question but a wh-question that asks "how", "when", "where", or "what" is used in order to acquire a specific word related to the visit destination A from the occupant 8.

When the occupant makes an answer such as "Miso ramen, which was delicious", an eating and drinking establishment that offers "miso ramen" is identified as the visit destination A, and therefore in step Sb20, such a visit destination A is generated and collected as visit destination information Db, and incidental information Dc including a date and time of the visit, "miso ramen" that is a menu item ordered by the occupant 8, and information such as "delicious" that is an impression on the menu item is generated and collected. In step Sb21, the visit destination information Db and the incidental information Dc are accumulated as the learned data 34 and learned.

Moreover, for example, when the departure time is 15:00 in the afternoon and the going-out duration is approximately 20 minutes, and when facilities Qa of a plurality of types of business at which a task can be done in a required time period of such approximately 20 minutes exist in surroundings, each of the facilities Qa of the plurality of types of business is extracted as a candidate for visit destination A. When the types of business can be narrowed down to one, the same applies as the above-illustrated example in which an eating and drinking establishment is extracted as a candidate for visit destination A.

In step Sb19, first, a dialog sentence such as "Welcome back. Where did you go?" is generated as a dialog sentence including a question for narrowing down a plurality of tasks or a plurality of visit destinations A to a specific task or visit destination A, and the dialog sentence is output by voice. For the question in the dialog sentence, a wh-question is used in order to acquire, from the occupant 8, a specific word required for narrowing down.

When the occupant 8 makes an answer such as "I just took clothing to the dry cleaners" to the question in the dialog sentence, a dry cleaners shop is identified as the visit destination A, and therefore in step Sb20, such a visit destination A is generated and collected as visit destination information Db, and a date and time of the visit is generated and collected as incidental information Dc. In step Sb21, the visit destination information Db and the incidental information Dc are accumulated as the learned data 34.

Note that in the latter example, information on a future action plan of the occupant 8, such as a scheduled date for picking up the dry-cleaned clothing, may be collected as incidental information Dc related to the visit to the dry cleaners shop. Specifically, in the visit information collection dialog, the dialog control section 52 generates a dialog sentence including a question that asks a future action plan, such as "When will you pick up the dry-cleaned clothing?", and outputs the dialog sentence by voice. When the occupant 8 makes an answer such as "Maybe around 15:00 tomorrow" to the question in the dialog sentence, an action plan including a date and time of "15:00 tomorrow" and an action of "picking up the dry-cleaned clothing" is collected as incidental information Dc. In such a case, the navigation device 6 may be configured to be able to access, or may manage, schedule data of the occupant 8, and may register the action plan in the schedule.

Thus, in the processing when an occupant returns, the visit destination information Db is collected from the occupant 8 through the visit information collection dialog, the presumed useful place Ps to the occupant 8 is learned, and the user profile data 33 is updated.

At an appropriate timing, such as when the vehicle 4 passes near the presumed useful place Ps or when the presumed useful place Ps is set as a destination, the content provision control section 56 acquires a content Da associated with the presumed useful place Ps from the content provision server 2, and the content Da is provided to the occupant 8.

According to the present embodiment, following advantageous effects are brought about.

In the present embodiment, the navigation device 6 includes: the position acquisition section 24 that acquires a current position of the vehicle 4; the surroundings search section 51 that searches for a facility Qa in surroundings of the vehicle 4; the dialog sentence generation section 61 that generates a dialog sentence including at least a question related to a visit destination A of the occupant 8; the dialog necessity determination section 62 that determines whether or not it is necessary to perform output of the dialog sentence including the question, based on a result of the acquisition by the position acquisition section 24 (that is, the current position), the number of results of the search by the surroundings search section 51, and a going-out duration of the occupant 8; the dialog control section 52 that outputs the dialog sentence including the question, depending on a result of the determination by the dialog necessity determination section 62; and the collection section 53 that collects visit destination information Db on the visit destination A, based on input information input by the occupant 8 through uttered voice in response to the question in the dialog sentence.

According to such a configuration, since the question related to the visit destination A is output depending on a situation that is identified based on the result of the acquisition by the position acquisition section 24, the number of the results of the search by the surroundings search section 51, and the going-out duration of the occupant 8, annoyance felt by the occupant 8 is reduced.

In the present embodiment, since the dialog necessity determination section 62 determines that it is not necessary to perform output of the dialog sentence including the question when the result of the acquisition by the position acquisition section 24 is an excluded point preset by the occupant 8, the annoyance can be further reduced.

In the present embodiment, since the dialog necessity determination section 62 determines that it is necessary to perform output of the dialog sentence including the question when the number of the results of the search by the surroundings search section 51 is one, the question related to the visit destination A based on the result of the search (which is a facility Qa) can be smoothly output without causing a feeling of unnaturalness.

In the present embodiment, when the number of the results of the search by the surroundings search section 51 is two or more (step Sb9: No in FIG. 5), the dialog necessity determination section 62 determines that it is not necessary to perform output of the dialog sentence including the question when the going-out duration exceeds the maximum threshold value Tmax, and determines that it is necessary to perform output of the dialog sentence including the question when the going-out duration does not exceed the maximum threshold value Tmax.

Thus, since the dialog necessity determination section 62 determines that output of the dialog sentence is not necessary when it is presumed that the occupant 8 visited a plurality of visit destinations A (that is, when the going-out duration exceeds the maximum threshold value Tmax), the annoyance can be further reduced.

In the present embodiment, the navigation device 6 includes the return determination section 60 that determines that the occupant 8 returns to the vehicle 4 from the visit destination A, based on a vehicle state of the vehicle 4. When it is determined by the return determination section 60 that the occupant 8 returns to the vehicle 4, the dialog necessity determination section 62 determines whether or not it is necessary to perform output of the dialog sentence including the question.

Thus, the necessity of the dialog sentence including the question can be determined at a timing when the occupant 8 returns to the vehicle 4 from the visit destination A.

In the present embodiment, when an elapsing time period since the occupant 8 left the vehicle 4 until it is determined by the return determination section 60 that the occupant 8 returns to the vehicle 4 does not exceed the predetermined minimum threshold value Tmin, the dialog necessity determination section 62 determines that it is not necessary to perform output of the dialog sentence including the question.

Thus, since the dialog necessity determination section 62 determines that it is not necessary to perform output of the dialog sentence when a probability is low that the occupant 8 went to any visit destination A and did any task (that is, when the elapsing time period does not exceed the predetermined minimum threshold value Tmin), the annoyance can be further reduced.

In the present embodiment, before the visit information collection dialog is carried out toward the occupant 8 who returns to the vehicle 4, the navigation device 6 determines whether or not the occupant 8 did a task at each of a plurality of facilities Qa when a plurality of facilities Qa that can be candidates for visit destination A exist in surroundings, and determines whether or not it is necessary to carry out the dialog, based on a result of the determination.

Accordingly, in a situation where the occupant 8 visited a plurality of visit destinations A, dialog sentences for many questions or the like for identifying the visit destinations A are not uttered from the navigation device 6, and the occupant 8 can be prevented from answering every one of the dialog sentences.

Thus, the annoyance can be eliminated that is caused to the occupant 8 by carrying out the visit information collection dialog toward the occupant 8 who visited the plurality of places.

In the present embodiment, when the going-out duration, which is an elapsing time period since the departure time at which the occupant 8 went out, exceeds a time period required to do a task at each of a plurality of facilities Qa (that is, the maximum threshold value Tmax), the navigation device 6 determines that the occupant 8 did a task at each of the plurality of facilities Qa. As a result, in the navigation device 6, the visit information collection dialog is not carried out toward the occupant 8.

Thus, it does not happen that even when the occupant 8 visited the plurality of visit destinations A, only information on any one visit destination A is collected through the visit information collection dialog and learned. In such a case, an area, a name of a place on the map, a name of a facility, or the like including the current position (position coordinate) is learned as a visit destination A, whereby a presumed useful place Ps can be appropriately learned.

In the present embodiment, in the navigation device 6, a required time period required for the occupant 8 to do a task is preset in the map data 32 or the like for each facility Qa, according to a type, or a type of business, of the facility Qa, and determination is performed, with a longest one of the required time periods for candidates for visit destination A in surroundings being set as the maximum threshold value Tmax. Thus, accuracy in the determination can be enhanced.

In the present embodiment, when the going-out duration, which is an elapsing time period since the departure time at which the occupant 8 went out, does not exceed the minimum threshold value Tmin, the navigation device 6 determines that is it not necessary to carry out the visit information collection dialog.

Thus, a situation can be avoided where the visit information collection dialog is started even when the occupant 8 did not visit any place.

In the present embodiment, when a plurality of facilities Qa that are candidates for visit destination A exist in surroundings, and when it is determined that the occupant 8 did a task at any one facility Qa, the navigation device 6 carries out the visit information collection dialog after narrowing down the candidates for visit destination A based on the task, which is presumed based on a time period of day including the departure time at which the occupant 8 went out.

Thus, in the visit information collection dialog, the number of questions asked of the occupant 8 to identify the visit destination A can be reduced.

In the present embodiment, the navigation device 6 updates the presumed useful place or places Ps recorded in the user profile data 33, based on visit destination information Db collected from the occupant 8.

Thus, since the user profile data 33 is automatically updated each time visit destination information Db is collected, the occupant 8 can save work and time spent to manually make an input into and update the user profile data 33.

In the present embodiment, since the navigation device 6 updates the presumed useful place or places Ps based on a result of the learning of the visit destination information Db, accuracy of each visit destination A recorded as a presumed useful place Ps is enhanced.

In the present embodiment, the navigation device 6 includes the content provision control section 56 that provides the occupant 8 with a content Da associated with a presumed useful place Ps.

Thus, a content Da associated with a place presumed to be useful to the occupant 8 can be automatically provided to the occupant 8, without the occupant 8 inputting an instruction or the like about the place.

The above-described embodiment shows an aspect of the present invention only for an illustrative purpose, and any modifications and applications can be made without departing from the scope of the present invention.

In the above-described embodiment, even if it is determined that the visit information collection dialog is not necessary because it is presumed that the occupant 8 visited a plurality of facilities Qa, the dialog necessity determination section 62 may allow the visit information collection dialog to be carried out in order to acquire visit destination information Db on a visit destination A when the visit destination A can be identified based on an item held by the occupant 8 who returns to the vehicle 4.

FIG. 6 shows a configuration of a navigation device 106 together with an in-vehicle system 109, according to a modification example. Note that in FIG. 6, the matters described in the above embodiment are denoted by the same reference signs, and a description thereof is omitted in the following.

In the present modification example, the item held by the occupant 8 is identified by performing image recognition of an image obtained by capturing an image of the occupant 8.

Specifically, as shown in FIG. 6, the in-vehicle system 109 includes an image-capturing section 116. The image-capturing section 116 includes a camera 116A that captures an image of the occupant 8 in the vehicle cabin, and a camera ECU 116B that controls the camera 116A and outputs an image captured by the camera 116A to the navigation ECU 20.

The dialog necessity determination section 62 of the navigation ECU 20 includes a visit destination identification section 169. When it is determined by the return determination section 60 that the occupant 8 returns, the visit destination identification section 169 performs image recognition processing on an image captured by the image-capturing section 116, and recognizes an item held by the occupant 8 appearing in the captured image. The visit destination identification section 169 recognizes signs such as a character and a mark put on the held item through the image recognition processing, and determines whether or not any facility Qa in surroundings can be identified based on the signs. For example, when the occupant 8 has a shopping bag as a held item, the visit destination identification section 169 recognizes a shop name put on the shopping bag, and determines whether or not a facility Qa corresponding to the shop name exists in surrounding. When the corresponding facility Qa exists in the surroundings, the facility Qa is identified as a visit destination A by the visit destination identification section 169.

According to the present modification example, since a visit destination A is identified by the visit destination identification section 169, a dialog sentence for identifying the visit destination A in the visit information collection dialog can be omitted, and visit destination information Db and incidental information Dc can be efficiently collected from the occupant 8, with a short dialog.

In the embodiment and the modification example described above, for learning by the learning section 54, artificial intelligence (AI) technology may be used.

In the embodiment and the modification example, the dialog necessity determination section 62 determines whether or not to carry out the visit information collection dialog, by using the current position of the vehicle 4, the departure time of the occupant 8, the going-out duration of the occupant 8, and the number of results of the search by the surroundings search section 51. However, regardless of such a configuration, the dialog necessity determination section 62 may perform the determination by using any one of the current position of the vehicle 4, the going-out duration of the occupant 8, and the number of results of the search by the surroundings search section 51.

In the embodiment and the modification example, a dialog sentence in the visit information collection dialog may include only a question related to a visit destination A.

In the embodiment and the modification example, output of a dialog sentence including at least a question related to a visit destination A is not limited to output by voice, but may be a display on the display section 28. The navigation device 6 may acquire an answer from the occupant 8 to the question, not through uttered voice of the occupant 8, but through an operation of the operation section 26.

In the embodiment and the modification example, the functional blocks shown in FIG. 2 and FIG. 6 represent schematic diagrams showing constituent elements of the navigation devices 6, 106 that are divided based on contents of the main processing, in order to facilitate understanding of the invention of the present application, and the constituent elements of the navigation device 6 can also be divided into further more constituent elements based on contents of the processing. Division can also be made such that one constituent element performs further more processing.

In FIG. 2 and FIG. 6, the function of each section connected to the in-vehicle systems 9, 109 may be integrally provided to the navigation devices 6, 106, or conversely, a functional section included in the navigation devices 6, 106 may be provided to the in-vehicle system 9, 109 side.

Moreover, in FIG. 2 and FIG. 6, a configuration may also be made such that a so-called cloud computer connected to the communication network NW executes the functions of the speech recognition section 14 and the learning section 54.

In the embodiment and the modification example, the navigation devices 6, 106 are illustrated as examples of an in-vehicle device. However, regardless of such examples, the information collection device of the present invention can be applied to any in-vehicle device.

In the embodiment and the modification example, an in-vehicle device is illustrated as the information collection device, but the information collection device is not limited to an in-vehicle device. In other words, the information collection device of the present invention can be applied to any information processing device equipped with a computer including a processor, a memory device, a storage, and a communication circuit.

For example, in an accommodation facility such as a hotel, an information processing device placed in a guest room may be configured as the information collection device of the present invention. In such a case, a subject person from which information is collected is a user of the guest room. The information processing device carries out the visit information collection dialog similarly to the navigation devices 6, 106 when the user who has gone out of the guest room returns to the guest room.

Thus, a popular visit destination A among users can be identified based on visit destination information Db and incidental information Dc collected from many users, and a content Da on the visit destination A can also be provided to users. Note that it can be identified whether or not the user goes out, and whether or not the user returns, for example, based on opening/closing of an entrance door of the guest room, a human-presence sensor installed in the guest room, a captured image of an inside of the guest room, or the like.

The following matters are also indicated by the present description.

An information collection device including: an audio output section that outputs, by voice, a dialog sentence in a dialog for collecting, from a subject person, visit destination information on a visit destination visited by the subject person; and a collection section that collects the visit destination information, based on a result of speech recognition of uttered voice uttered by the subject person in response to the dialog sentence, includes: a surroundings search section that searches for a facility in surroundings; and a dialog control section that carries out the dialog when the subject person who has gone out returns, wherein the dialog control section includes a dialog necessity determination section that, when a plurality of facilities that are candidates for visit destination of the subject person exist in the surroundings, determines whether or not the subject person did a task at each of the plurality of facilities, and determines, based on a result of the determination, whether or not it is necessary to carry out the dialog.

In the information collection device, the dialog necessity determination section determines that the subject person did a task at each of the plurality of facilities when an elapsing time period since a departure time at which the subject person went out exceeds a time period required to do the respective task at each of the plurality of facilities.

In the information collection device, the dialog necessity determination section determines that it is not necessary to carry out the dialog when the elapsing time period since the departure time at which the subject person went out does not exceed a predetermined minimum threshold value.

In the information collection device, when a plurality of facilities that are candidates for visit destination of the subject person exist in the surroundings, and when it is determined by the dialog necessity determination section that the subject person did a task at one facility, the dialog control section carries out the dialog after narrowing down the candidates for visit destination, based on the task that is presumed based on a time period of day including the departure time at which the subject person went out.

The information collection device includes: a storage section that stores user profile data indicating an attribute or a characteristic of the subject person; and a user profile update section that updates the user profile data, wherein information related to a place useful to the subject person is recorded in the user profile data, and the user profile update section updates the information related to the useful place, based on the visit destination information collected by the collection section.

The information collection device includes a learning section that learns the visit destination information collected by the collection section, wherein the user profile update section updates the information related to the useful place, based on a result of the learning by the learning section.

The information collection device includes a content provision control section that provides the subject person with a content associated with the useful place.

The information collection device includes a visit destination identification section that identifies the visit destination, based on a captured image of a held item held by the subject person who returns, wherein even if it is determined that it is not necessary to carry out the dialog, the dialog necessity determination section determines that it is necessary to carry out the dialog when the visit destination is identified by the visit destination identification section.

The information collection device is an in-vehicle device mounted in a vehicle, wherein the subject person is an occupant who returns to the vehicle after leaving the stopped vehicle, and the facility in the surroundings is a facility existing around a position where the vehicle is stopped.

REFERENCE SIGNS LIST

1 Information provision system
2 Content provision server
4 Vehicle
6, 106 Navigation device (information collection device)
8 Occupant
9, 109 In-vehicle system
14 Speech recognition section
24 Position acquisition section
Audio output section
33 User profile data
51 Surroundings search section
52 Dialog control section (question output control section)
53 Collection section
54 Learning section
User profile update section
56 Content provision control section
61 Dialog sentence generation section (question generation section)
62 Dialog necessity determination section (question output necessity determination section)
63 Excluded-point determination section
64 Departure determination section
Departure time acquisition section
66 Return time acquisition section
67 Going-out duration calculation section
116 Image-capturing section
169 Visit destination identification section
A Visit destination
Da Content
Db Visit destination information
Dc Incidental information
20 Navigation ECU
Ps Presumed useful place
Q Commercial complex
Qa Facility
Tmax Maximum threshold value
Tmin Minimum threshold value

The invention claimed is:
1. An information collection device, comprising:
a processor,
wherein the processor includes:
a position acquisition section that acquires a current position of an own vehicle;
a surroundings search section that searches for a facility in surroundings of the own vehicle;
a question generation section that generates a question related to a visit destination of a subject person;
a question output necessity determination section that determines whether or not it is necessary to perform output of the question, based on at least the number of results of the search by the surroundings search section, and a going-out duration of the subject person;
a question output control section that outputs the question, depending on a result of the determination by the question output necessity determination section; and
a collection section that collects information on the visit destination, based on input information input by the subject person in response to the question,
wherein the going-out duration is a going-out time between a departure time of the own vehicle when the subject person goes out to the visit destination to a return time when the subject person returns to the own vehicle,
wherein when the number of the results of the search by the surroundings search section is two or more,
the question output necessity determination section determines that it is not necessary to perform output of a dialog sentence including the question when the going-out duration exceeds a maximum threshold value, and determines that it is necessary to perform output of the dialog sentence including the question when the going-out duration does not exceed the maximum threshold value.

2. The information collection device according to claim 1, wherein the question output necessity determination section determines that it is not necessary to perform output of the question when the result of the acquisition by the position acquisition section is an excluded point preset by the subject person.

3. The information collection device according to claim 1, wherein the question output necessity determination section determines that it is necessary to perform output of the question when the number of the results of the search by the surroundings search section is one.

4. The information collection device according to claim 1, further comprising a return determination section that determines that the subject person returns to the own vehicle from the visit destination, based on a vehicle state of the own vehicle,
wherein when it is determined by the return determination section that the subject person returns to the own vehicle, the question output necessity determination section determines whether or not it is necessary to perform output of the question.

5. The information collection device according to claim 4, wherein the question output necessity determination section determines that it is not necessary to perform output of the question when an elapsing time period does not exceed a predetermined minimum threshold value, the elapsing time period since the subject person left the own vehicle until it is determined by the return determination section that the subject person returns to the own vehicle.

6. An information collection device, comprising:
a processor,
wherein the processor includes:
a position acquisition section that acquires a current position of an own vehicle;
a surroundings search section that searches for a facility in surroundings of the own vehicle;
a question generation section that generates a question related to a visit destination of a subject person;
a question output necessity determination section that determines whether or not it is necessary to perform output of the question, based on at least one of a result of the acquisition by the position acquisition section, the number of results of the search by the surroundings search section, and a going-out duration of the subject person;
a question output control section that outputs the question, depending on a result of the determination by the question output necessity determination section; and
a collection section that collects information on the visit destination, based on input information input by the subject person in response to the question,
wherein the processor further includes a return determination section that determines that the subject person returns to the own vehicle from the visit destination, based on a vehicle state of the own vehicle,
wherein when it is determined by the return determination section that the subject person returns to the own vehicle, the question output necessity determination section determines whether or not it is necessary to perform output of the question,
wherein the question output necessity determination section determines that it is not necessary to perform output of the question when an elapsing time period does not exceed a predetermined minimum threshold value, the elapsing time period since the subject person left the own vehicle until it is determined by the return determination section that the subject person returns to the own vehicle.

7. A control method in an information collection device executed by a processor, comprising:
a first step of acquiring a current position of an own vehicle by the processor;
a second step of searching for a facility in surroundings of the own vehicle by the processor;
a third step of generating a question related to a visit destination of a subject person by the processor;
a fourth step of determining whether or not it is necessary to perform output of the question by the processor, based on at least the number of results of the search in the second step, and a going-out duration of the subject person;
a fifth step of outputting the question by the processor, depending on a result of the determination in the fourth step; and
a sixth step of collecting information on the visit destination by the processor, based on input information input by the subject person in response to the question,
wherein the going-out duration is a going-out time between a departure time of the own vehicle when the subject person goes out to the visit destination to a return time when the subject person returns to the own vehicle,
wherein when the number of the results of the search of the fourth step is two or more,
the processor determines that it is not necessary to perform output of a dialog sentence including the question when the going-out duration exceeds a maximum threshold value, and
determines that it is necessary to perform output of the dialog sentence including the question when the going-out duration does not exceed the maximum threshold value.

8. The information collection device according to claim 6, wherein the processor further includes a visit destination identification section that identifies the visit destination, based on a captured image of a held item held by the subject person who returns,
wherein even if it is determined that it is not necessary to perform output of the question, the question output necessity determination section determines that it is necessary to perform output of the question when the visit destination is identified by the visit destination identification section.

9. The information collection device according to claim 6, wherein the processor further includes a visit destination identification section that identifies the visit destination, based on a captured image of a held item held by the subject person who returns,
wherein even if it is determined that it is not necessary to perform output of the question, the question output necessity determination section determines that it is necessary to perform output of the question when the visit destination is identified by the visit destination identification section.

* * * * *